United States Patent Office 3,578,623
Patented May 11, 1971

3,578,623
COMPOSITIONS OF SATURATED POLYESTERS, INORGANIC SOLIDS, AND CYCLIC CARBONATES
Klaus Weissermel, Kelkheim, Taunus, and Rudolf Uebe, Eschborn, Taunus, Germany, assignors to Farbwerke Hoechst Aktiengesellschaft vormals Meister Lucius & Bruning, Frankfurt am Main, Germany
No Drawing. Filed Mar. 21, 1969, Ser. No. 809,432
Claims priority, application Germany, Apr. 6, 1968,
P 17 69 119.9
Int. Cl. C08g 51/04
U.S. Cl. 260—40                                      15 Claims

ABSTRACT OF THE DISCLOSURE

Thermoplastically processible moulding compositions of linear saturated polyesters of aromatic dicarboxylic acids, inert inorganic solid substances and cyclic carbonates that yield shaped articles free from flash.

---

The present invention relates to thermoplastic moulding compositions containing polyesters.

It is known that polyesters of aromatic dicarboxylic acids with appropriate aliphatic diols cannot only be spun into filaments and drawn into sheets and films but also processed thermoplastically into shaped articles under determined conditions. When injection moulding such moulding compositions, however, phenomena appear which render it difficult to obtain the said products in an economical manner. Such phenomena are, for example, flash formation, thermal degradation of the polyester mass in the injection machine and the insufficient speed of crystallization of the polyester material in the mould. These difficulties cannot be removed by simply varying the processing conditions prevailing during injection moulding. The processing temperature depends on the crystallite melting point of the polyester. Polyethylene terephthalate, for example, can be processed thermoplastically only at temperatures above 250° C. To fill the moulds completely, a corresponding post pressure must be applied which, however, generally leads to the undesirable flash formation. In order that the moulded article may crystallize as rapidly as possible in the mould, the latter is heated and crystallization promoting substances are admixed with the polyester, for example, in the form of finely ground minerals.

The present invention provides a thermoplastic moulding composition of excellent properties, comprising a mixture of:

(a) A linear saturated polyester of an aromatic dicarboxylic acid and optionally a small amount of an aliphatic dicarboxylic acid with a saturated aliphatic or cycloaliphatic diol, (b) 0.05 to 2% by weight, preferably 0.1 to 0.5% by weight, calculated on the polyester, of an inert inorganic solid substance of a particle size below 5μ, for example, talc, kaolin, a metal oxide, for example titanium dioxide, antimony oxide and magnesium oxide, an alkali metal salt or alkaline earth metal salt, for example a carbonate or fluoride, and (c) 0.05 to 2% by weight, preferably 0.2 to 1% by weight, calculated on the polyester, of a cyclic carbonate of the following formula

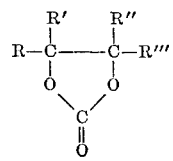

in which R, R', R" and R'" each represent hydrogen or an alkyl, cycloalkyl, aralkyl or aryl group which may contain an ether group, at least one of these groups containing a cyclic carbonate group.

The cyclic carbonates to be used in accordance with the invention completely suppress the formation of flash. Whereas, for example, a polyethylene terephthalate nucleated with 0.4% by weight talc and having a relative specific viscosity of 1.38 dl./g. already shows pronounced flash formation under a post pressure of 70 atmospheres gage, a product prepared with a cyclic carbonate shows no flash formation even under a considerably higher post pressure. Furthermore, by the addition of the carbonates the speed of crystallization in the mould is increased and finally, this being particularly surprising, the thermal degradation of the polyester mass is prevented. It is even possible to raise the relative specific viscosity.

As linear polyester polyethylene terephthalate is preferably used. It is also possible to use other polyesters, for example polycyclohexane-(1,4)-dimethylol terephthalate. There may also be used modified polyethylene terephthalates containing, in addition to terephthalic acid, also other aromatic or aliphatic dicarboxylic acids as basic units, for example, isophthalic acid, naphthalene-dicarboxylic acid-(1,6) or adipic acid. It is likewise possible to use modified polyethylene terephthalates containing, in addition to ethylene glycol, also other aliphatic diols, for example, neopentyl glycol or butanediol-(1,4), as the alcoholic component. Polyesters of oxycarboxylic acids may also be used. The polyesters advantageously have a reduced specific viscosity within the range of from 0.6 to 2.0 dl./g., preferably 0.9 to 1.6 dl./g., measured in a 1% solution in a mixture of phenol and tetrachloroethane (60:40) at 25° C. Polyesters having a reduced specific viscosity within the range of from 1.1 to 1.5 dl./g., are particularly suitable.

As inorganic crystallization promoting substances talc, kaolin, titanium dioxide, aluminum oxide and calcium carbonate may, for example, be used. These substances advantageously have a particle size below 5μ.

As cyclic carbonate compounds the following substances may, for example, be used: the diether of butanediol-(1,4) with the 1,2-carbonate of glycerol, the diether of hexanediol-(1,6) with the 1,2-carbonate of glycerol, the diether of 1,4-dimethylolcyclohexane with the 1,2-carbonate of glycerol, 1,2-dioxy-4[α,β-dioxyethyl]-cyclohexane dicarbonate, 1,2,5,6-tetraoxyhexane dicarbonate and 1,2,3,4-erythritol dicarbonate.

In principle, the additives may be added to the polycondensate one after another or all at the same time to obtain the above effects in the injection moulding of shaped articles. The inorganic crystallization promoting substance may be fed to the screw before, during or after the polycondensation. In this manner, a uniformly nucleated granular polyester is obtained after extrusion. The carbonate is then applied by rolling, either in substance or while dissolved in an appropriate solvent which is then removed. The polyester mass so prepared may then be directly injection moulded into shaped articles. It is, however, advantageous to homogeneously incorporate the superficially applied carbonate before injection moulding by melting the product again in the extruder.

Alternatively, the inorganic crystallization promoting substance and the carbonate may be applied together to the granular polyester by rolling and the composition may then be made into a homogeneous polyester mass suitable for injection moulding by melting it on the extruder and subsequently granulating it. It is a general condition that all operations must be carried out with complete exclusion from moisture to avoid hydrolysis of the polyester and the carbonate. The polyester moulding composition advantageously contains less than 0.01% by weight water. To obtain a rapid crystallization in the mould and consequently a short injection cycle, the mould must be heated to at least 100° C. Mould temperatures within the range of from 120 to 150° C. are particularly advantageous.

The following examples serve to illustrate the invention but are not intended to limit it.

EXAMPLES

In each case, 1.5 kilograms granular polyethylene terephthalate containing 0.4% by weight of finely divided talc and having a moisture content of 0.008% by weight and a relative specific viscosity of 1.38 dl./g., were rolled for 1 hour at 50° C. with one of the following three cyclic carbonates:

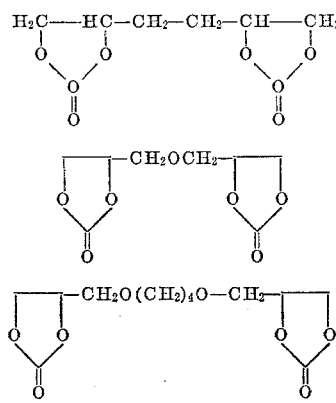

Carbonate compounds A, B and C were used in three different concentrations. The granular product so treated was homogenized at 275° C. on an extruder (residence time in the extruder 1.5 minutes, 36 revolutions of screw per minute), extruded and granulated in water. The product was thoroughly dried at 180° C. in vacuo and then injection moulded into plates 60 x 60 x 2 millimeters. Each charge was subjected to the same conditions: temperature of cylinder 270° C./260° C./260° C., temperature of mould 140° C., injection time 15 seconds, injection pressure 140 atmospheres gage. The moulding time and the post pressure were varied in each case.

The results ascertained are indicated in the following Table 1. For a comparison, the values obtained in a granular polyester without cyclic carbonate are given in the following Table 2.

TABLE 1

| Cyclic carbonate | Amount in percent by weight | Specific viscosity (dl./g.) | | | Flash formation [1] under variable post pressure | |
| --- | --- | --- | --- | --- | --- | --- |
| | | Starting polyester | After incorporation by granulation of A, B and C | After injection moulding | Post pressure (atmospheres gage) | Flash |
| A | 0.2 | 1.38 | 1.25 | 1.22 | 70/100/140 | None, none, weak. |
| | 0.4 | | 1.31 | 1.33 | | |
| | 0.8 | | 1.39 | 1.47 | Up to 140 | None. |
| B | 0.2 | 1.38 | 1.31 | 1.37 | 70/100/140 | None, weak, weak. |
| | 0.4 | | 1.38 | 1.45 | | |
| | 0.8 | | 1.41 | 1.57 | Up to 140 | None. |
| C | 0.2 | 1.38 | 1.30 | 1.35 | 70/100/140 | None, none, weak. |
| | 0.4 | | 1.39 | 1.48 | | |
| | 0.8 | | 1.44 | 1.59 | Up to 140 | None. |

| Cyclic carbonate in percent by weight | | Density at different moulding times | |
| --- | --- | --- | --- |
| | | Sec. | D. |
| A | 0.4 | 2 | 1.369 |
| | | 5 | 1.374 |
| | | 10 | 1.376 |
| | | 15 | 1.377 |
| B | 0.4 | 2 | 1.369 |
| | | 5 | 1.371 |
| | | 10 | 1.372 |
| | | 15 | 1.375 |
| C | 0.4 | 2 | 1.371 |
| | | 5 | 1.372 |
| | | 10 | 1.374 |
| | | 15 | 1.375 |

[1] Moulding time 15 seconds.

TABLE 2

[Comparison: Polyester mass free from cyclic carbonate]

| Specific viscosity before and after injection moulding | | Density at different moulding times | | Flash formation | |
| --- | --- | --- | --- | --- | --- |
| | | Sec. | D. | Post pressure (atmospheres gage) | Flash |
| 1.38 | 1.08 | 2 | 1.374 | 70 | Flash formation very pronounced. |
| | | 5 | 1.374 | | |
| | | 10 | 1.375 | 140 | |
| | | 15 | 1.375 | | |
| | | 30 | 1.375 | | |

What is claimed is:

1. Thermoplastic moulding compositions comprising a mixture of
   (a) a linear saturated polyester of an aromatic dicarboxylic acid and optionally a small amount of an aliphatic dicarboxylic acid with a saturated aliphatic or cycloaliphatic diol,
   (b) 0.05 to 2% by weight, calculated on the polyester, of an inert inorganic solid substance of a particle size below 5μ, and
   (c) 0.05 to 2% by weight, calculated on the polyester, of a cyclic carbonate of the following formula

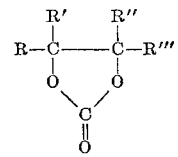

in which R, R', R" and R"' each represent hydrogen or an alkyl, cycloalkyl, aralkyl or aryl group which may contain an ether group, at least one of these groups containing a cyclic carbonate group.

2. A thermoplastic moulding composition as claimed in claim 1 wherein the linear saturated polyester is polyethylene glycol terephthalate.

3. A thermoplastic moulding composition as claimed in claim 1 wherein the linear saturated polyester is polycyclohexane-(1,4,)-dimethylol terephthalate.

4. A thermoplastic moulding composition as claimed in claim 1 wherein the linear saturated polyester contains, in addition to terephthalic acid, other aromatic or aliphatic dicarboxylic acids as a further acid component.

5. A thermoplastic moulding composition as claimed in claim 4 wherein the linear saturated polyester contains, in addition to terephthalic acid, a dicarboxylic acid selected from the group consisting of isophthalic acid, naphthalene-dicarboxylic acid-(1,6) and adipic acid as a further acid component.

6. A thermoplastic moulding composition as claimed in claim 1 wherein the linear saturated polyester contains, in addition to ethylene glycol, other aliphatic diols as the diol component.

7. A thermoplastic moulding composition as claimed in claim 6 wherein the linear saturated polyester contains, in addition to ethylene glycol, other aliphatic diols selected from the group consisting of neopentyl glycol and butanediol-(1,4) as the diol component.

8. A thermoplastic moulding composition as claimed in claim 1 wherein the linear saturated polyester contains oxycarboxylic acids as the acid component.

9. A thermoplastic moulding composition as claimed in claim 1 wherein the linear saturated polyester has a reduced specific viscosity within the range of from 0.6 to 2.0 dl./g., measured in a 1% solution in a mixture of phenol and tetrachloroethane (60:40) at 25° C.

10. A thermoplastic moulding composition as claimed in claim 1 wherein the linear saturated polyester has a reduced specific viscosity within the range of from 0.9 to 1.6 dl./g., measured in a 1% solution in a mixture of phenol and tetrachloroethane (60:40) at 25° C.

11. A thermoplastic moulding composition as claimed in claim 1 wherein the linear saturated polyester has a reduced specific viscosity within the range of from 1.1 to 1.5 dl./g., measured in a 1% solution in a mixture of phenol and tetrachloroethane (60:40) at 25° C.

12. A thermoplastic moulding composition as claimed in claim 1 wherein the inert inorganic solid substance is a compound selected from the group consisting of talc, kaolin, titanium dioxide, aluminum oxide and calcium carbonate.

13. A thermoplastic moulding composition as claimed in claim 1 wherein the cyclic carbonate is a compound selected from the group consisting of the diether of butanediol-(1,4) with the 1,2-carbonate of glycerol, the diether of hexanediol-(1,6) with the 1,2-carbonate of glycerol, the diether of 1,4-dimethylol-cyclohexane with the 1,2-carbonate of glycerol, 1,2-dioxy-4[$\alpha,\beta$-dioxyethyl]-cyclohexane dicarbonate, 1,2,5,6-tetraoxyhexane dicarbonate and 1,2,3,4-erythritol dicarbonate.

14. A thermoplastic moulding composition as claimed in claim 1 wherein the cyclic carbonates are used in an amount within the range of from 0.2 to 1% by weight calculated on the polyester.

15. Shaped articles made of the thermoplastic moulding compositions claimed in claim 1.

References Cited
UNITED STATES PATENTS 3,402,141  9/1968  Matthies et al. _____ 260—40
3,479,318  11/1969  Jackson et al. _____ 260—40

L. T. JACOBS, Assistant Examiner

MORRIS LIEBMAN, Primary Examiner

U.S. Cl. X.R.

260—75